Aug. 21, 1923.
K. J. E. HESSELMAN
1,465,822
FUEL SUPPLY VALVE
Filed Oct. 24, 1922
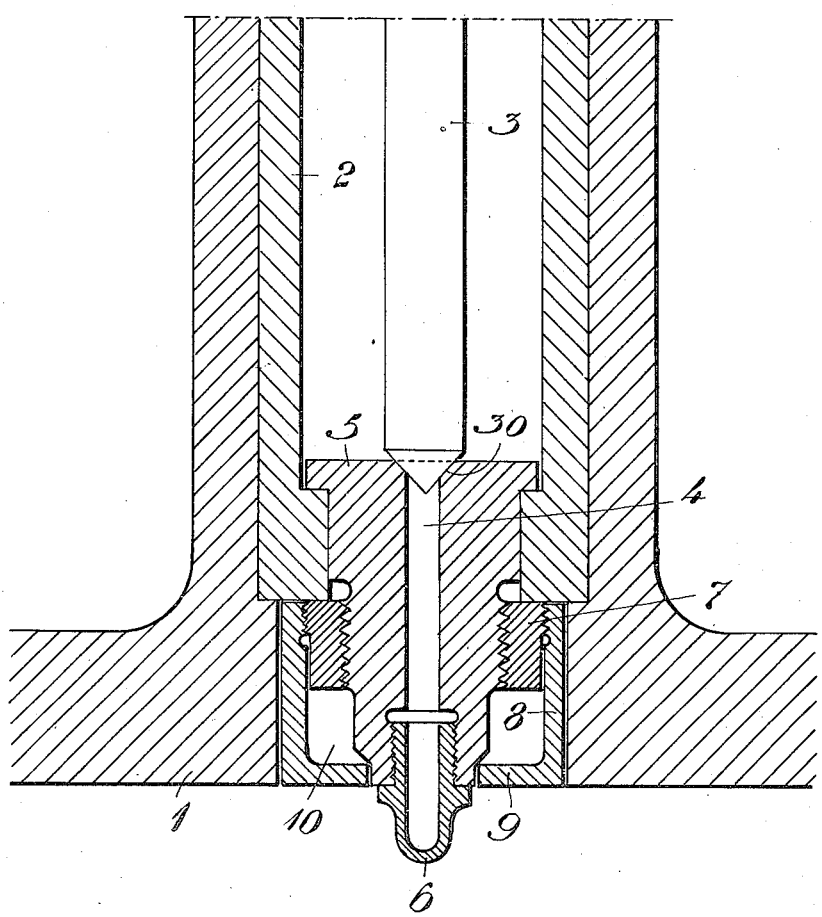
Inventor.
Knut J. E. Hesselman
By Henry Ooth Jr.
Atty.

Patented Aug. 21, 1923.

1,465,822

UNITED STATES PATENT OFFICE.

KNUT JONAS ELIAS HESSELMAN, OF SALTSJO-STORANGEN, SWEDEN.

FUEL-SUPPLY VALVE.

Application filed October 24, 1922. Serial No. 596,625.

*To all whom it may concern:*

Be it known, that I, KNUT JONAS ELIAS HESSELMAN, a citizen of the Kingdom of Sweden, residing at Saltsjo-Storangen, Sweden, have invented new and useful Improvements in Fuel Supply Valves, of which the following is a specification.

In fuel supply valves for internal combustion engines having direct injection of liquid fuel it has proved advisable to place the valve seat so as to form a space between the seat and the injecting or spraying nozzle proper. Said space will be kept filled with fuel oil in the intervals between the injections and unless special provisions are made said oil will be heated due to the contact with the walls of said space so that the volume of the oil is increased and causes part of the oil to squeeze through the nozzle which results in formation of drops, incomplete combustion or formation of smoke within the combustion chamber of the engine. The means as hitherto proposed for avoiding said inconvenience comprises, as far as I am aware, water cooling of the valve seat or sometimes the provision of cooling passages in the proper spraying nozzle. Such means, however, are expensive and may cause leakage.

According to the present invention the said oil is prevented from undesired heating by the provision of a heat insulation between the combustion chamber of the engine and the part of the valve device containing said oil space.

In the accompanying drawing forming part of this specification, a longitudinal section through one embodiment of the invention is illustrated.

In the drawing, the numeral 1 indicates the cylinder cover of an engine having direct injection of liquid fuel. Inserted in the cover 1 is the casing 2 of a fuel valve 3. The valve 3 is shaped as a needle valve engaging a seat 30 formed at the upper edge of a boring 4 extending through a plug-shaped member 5, inserted into the lower end of the casing 1, said member 5 reaching somewhat beyond the said lower end and carries outside thereof the spraying nozzle proper 6 extending into the combustion chamber (not shown). The member 5 is held in place by means of a nut 7. Threaded on the external side of the nut 7 is a sleeve 8 having an inwardly extending flange 9 at its outer end, said flange fitting snugly around the lower extreme portion of the member 5. Between the sleeve 8 with its flange 9, the nut 7 and the member 5 there is formed a closed air-space 10 serving as a heat insulation. It is easily understood that said space 10 should have so ample dimensions as to positively prevent heat from being carried from the cylinder chamber and to the member 5 and the oil contained in the channel 4 of said member 5. The space 10 may, if desired, be filled with any suitable heat insulating material.

What I claim is:—

1. In a valve for direct admission of liquid fuel into the combustion chamber of internal combustion engines, the combination of a valve body, a valve seat, a spraying nozzle, between which and the said seat a space is formed, which is filled with liquid fuel in the intervals between successive injections, and a heat insulation between said space and the combustion chamber of the engine.

2. In a valve for direct admission of liquid fuel into the combustion chamber of internal combustion engines, the combination of a casing, a valve body in said casing, a member inserted in said casing and projecting to some extent therefrom, said member having a fuel passage through it and a valve seat inside the casing, a spraying nozzle at the outer end of said fuel passage, and an insulating cover surrounding the projecting part of said member.

3. In a valve for direct admission of liquid fuel into the combustion chamber of internal combustion engines, the combination of a casing, a valve body in said casing, a member inserted in said casing and projecting to some extent therefrom, said member having a fuel passage through it and a valve seat inside the casing, a spraying nozzle at the outer end of said fuel passage, a nut screwed on the projecting end of said member to hold same in place, and a cover screwed on said nut to surround the projecting end of the member, said cover being shaped to form a closed air-space around said projecting end.

In testimony whereof I have signed my name

KNUT JONAS ELIAS HESSELMAN.